(12) United States Patent
Kao et al.

(10) Patent No.: US 9,222,599 B2
(45) Date of Patent: Dec. 29, 2015

(54) SELF-CLOSING WATER-SAVING VALVE ASSEMBLY

(71) Applicant: HIGHPLUS INTERNATIONAL CO., LTD., New Taipei (TW)

(72) Inventors: Chih-Hung Kao, New Taipei (TW); Chin-Yuan Hsiao, New Taipei (TW)

(73) Assignee: HIGHPLUS INTERNATIONAL CO., LTD., New Taipei (TW)

( * ) Notice: Subject to any disclaimer, the term of this patent is extended or adjusted under 35 U.S.C. 154(b) by 157 days.

(21) Appl. No.: 13/759,794

(22) Filed: Feb. 5, 2013

(65) Prior Publication Data

US 2014/0217314 A1   Aug. 7, 2014

(51) Int. Cl.
   *F16K 47/02*   (2006.01)
   *F16K 21/06*   (2006.01)
   *E03C 1/08*    (2006.01)

(52) U.S. Cl.
   CPC ............... *F16K 47/023* (2013.01); *F16K 21/06* (2013.01); *E03C 1/08* (2013.01)

(58) Field of Classification Search
   CPC ....... F16K 47/02; F16K 47/023; F16K 15/02; F16K 15/06; F16K 21/04; F16K 21/06; F16K 21/16; E03C 1/0412; E03C 1/08; B05B 1/3026; B05B 1/1609; B05B 1/1636
   USPC ............... 251/339, 319, 320, 321, 12, 14, 61, 251/61.2; 239/583; 137/801
   See application file for complete search history.

(56) References Cited

U.S. PATENT DOCUMENTS

| | | | | | |
|---|---|---|---|---|---|
| 80,474 | A | * | 7/1868 | Good, Jr. | 137/332 |
| 3,348,520 | A | * | 10/1967 | Lockwood | 118/667 |
| 3,999,570 | A | * | 12/1976 | Clements | 137/517 |
| 5,704,397 | A | * | 1/1998 | Lu | 137/630.15 |
| 6,131,608 | A | * | 10/2000 | Lu | 137/550 |
| 6,942,195 | B2 | * | 9/2005 | Kao | 251/339 |
| 7,143,997 | B2 | * | 12/2006 | Kao | 251/339 |
| 7,975,980 | B2 | * | 7/2011 | Gao et al. | 251/48 |
| 2009/0045370 | A1 | * | 2/2009 | Kao et al. | 251/324 |
| 2012/0018661 | A1 | * | 1/2012 | Kao et al. | 251/359 |

* cited by examiner

*Primary Examiner* — William McCalister
*Assistant Examiner* — Ian Paquette
(74) *Attorney, Agent, or Firm* — Ditthavong & Steiner, P.C.

(57) ABSTRACT

A self-closing water-saving valve assembly has a casing, a seat, a pushing rod, a closing member and a stand. When said valve assembly is switched off, the closing member and the stand slow down the closing movement into a gradual manner, which can effectively reduce positive and negative pressure waves generated in the water pipe. Noises and damage to the water pipe are also prevented. Besides, the pushing rod is moved down by gravity and slight water pushing, which eliminates the problems of wear and speeded-up movement of the pushing rod. Therefore, the valve assembly has prolonged lifespan. In addition, the water pressure is not directly applied on the pushing rod and only slight water pushes the pushing rod such that it is easier for a user to push the pushing rod to switch on the valve assembly.

19 Claims, 11 Drawing Sheets

SELF-CLOSING WATER-SAVING VALVE ASSEMBLY

BACKGROUND OF THE INVENTION

1. Field of the Invention

The present invention relates to a self-closing water-saving valve assembly, especially to a self-closing water-saving valve assembly that can reduce the water hammer and has prolonged lifespan.

2. Description of the Prior Arts

A conventional valve assembly is mounted on a top of a tap and has the advantage of a simple structure. However, a user has to raise his hand to switch off the valve assembly on the top of the tap after washing, and this movement causes waste of water.

To solve the shortcoming mentioned above, an infrared-sensor valve assembly is provided. When being washed, hands of a user are placed at a sensing zone to activate the infrared-sensor valve assembly by infrared light. After washing, the infrared-sensor valve assembly is automatically switched off because the hands are removed. Therefore, a water-saving effect is achieved. However, as the sensing zone is a specific area, users may have to try many times to properly place the hands in the sensing zone, which is inconvenient.

As a result, a self-closing water-saving valve assembly is invented. With reference to FIG. 10, the self-closing water-saving valve assembly has a casing 91, a pushing rod 92, a timing gasket 93 and a closing gasket 94. The casing 91 has an inlet 911, an outfall 912 and a timing channel 913. The pushing rod 92 is mounted in the timing channel 913 and the inlet 911. A bottom end of the pushing rod 92 protrudes out of the casing 91. The timing gasket 93 is mounted around the pushing rod 92 and abuts an inner wall of the timing channel 913. The closing gasket 94 is mounted on a top end of the pushing rod 92 and selectively seals the inlet 911.

With reference to FIG. 11, when the self-closing water-saving valve assembly is in use, the pushing rod 92 is pushed up such that the closing gasket 94 departs from the inlet 911. Then the water in the water pipe can enter the inlet 911 and flow out from the outfall 912. When the water is passing through, the water keeps hitting against the top end of the pushing rod 92 and accordingly the pushing rod 92 moves downward gradually. However, because the timing gasket 93 mounted securely to the pushing rod 92 abuts the inside wall of the timing channel 913 and generates an abrasion force, the pushing rod 92 moves down slowly. With reference to FIG. 10, finally, the closing gasket 94 on the top end of the pushing rod 92 seals the inlet 911 again and the water stops flowing out, which achieves the self-closing effect.

Nevertheless, the conventional self-closing water-saving valve assembly still has two shortcomings First, the moment the closing gasket 94 seals the inlet 911, the water flowing in the water pipe hits the sealed inlet 911 suddenly and stops flowing such that a series of positive and negative pressure waves are generated and vibrate in the water pipe until the energy is exhausted by friction. This condition is so-called water hammer and causes discordant noises and damage to the water pipe. Besides, because the water pressure is large, a force applied to the pushing rod 92 to open the valve assembly is also large to resist the water pressure. The operation is not smooth and inconvenient.

Second, every time the valve assembly is opened and closed, the timing gasket 93 rubs against the inside wall of the timing channel 913. So after a period of time of use, the timing gasket 93 may be worn away and an outer diameter of the timing gasket 93 decreases. The abrasion force between the timing gasket 93 and the timing channel 913 is weakened, which speeds up the downward movement of the pushing rod 92 and reduces the amount of the water flowing out. As a result, a lifespan of the conventional self-closing water-saving valve assembly is shortened.

To overcome the shortcomings, the present invention provides a self-closing water-saving valve assembly to mitigate or obviate the aforementioned problems.

SUMMARY OF THE INVENTION

The main objective of the present invention is to provide a self-closing water-saving valve assembly that can reduce the water hammer and has prolonged lifespan.

The self-closing water-saving valve assembly has a casing, a seat, a pushing rod, a closing member and a stand. When the valve assembly as mentioned is switched off, the closing member and the stand slow down the closing movement into a gradual manner, which can effectively reduce positive and negative pressure waves generated in the water pipe. Noises and damage to the water pipe are also prevented. Besides, the pushing rod is moved down by gravity and slight water pushing, which eliminates the problems of wear and speeded-up movement of the pushing rod. Therefore, the valve assembly has prolonged lifespan. In addition, the water pressure is not directly applied on the pushing rod and only slight flow of water pushes the pushing rod such that it is easier for a user to push the pushing rod to switch on the valve assembly.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
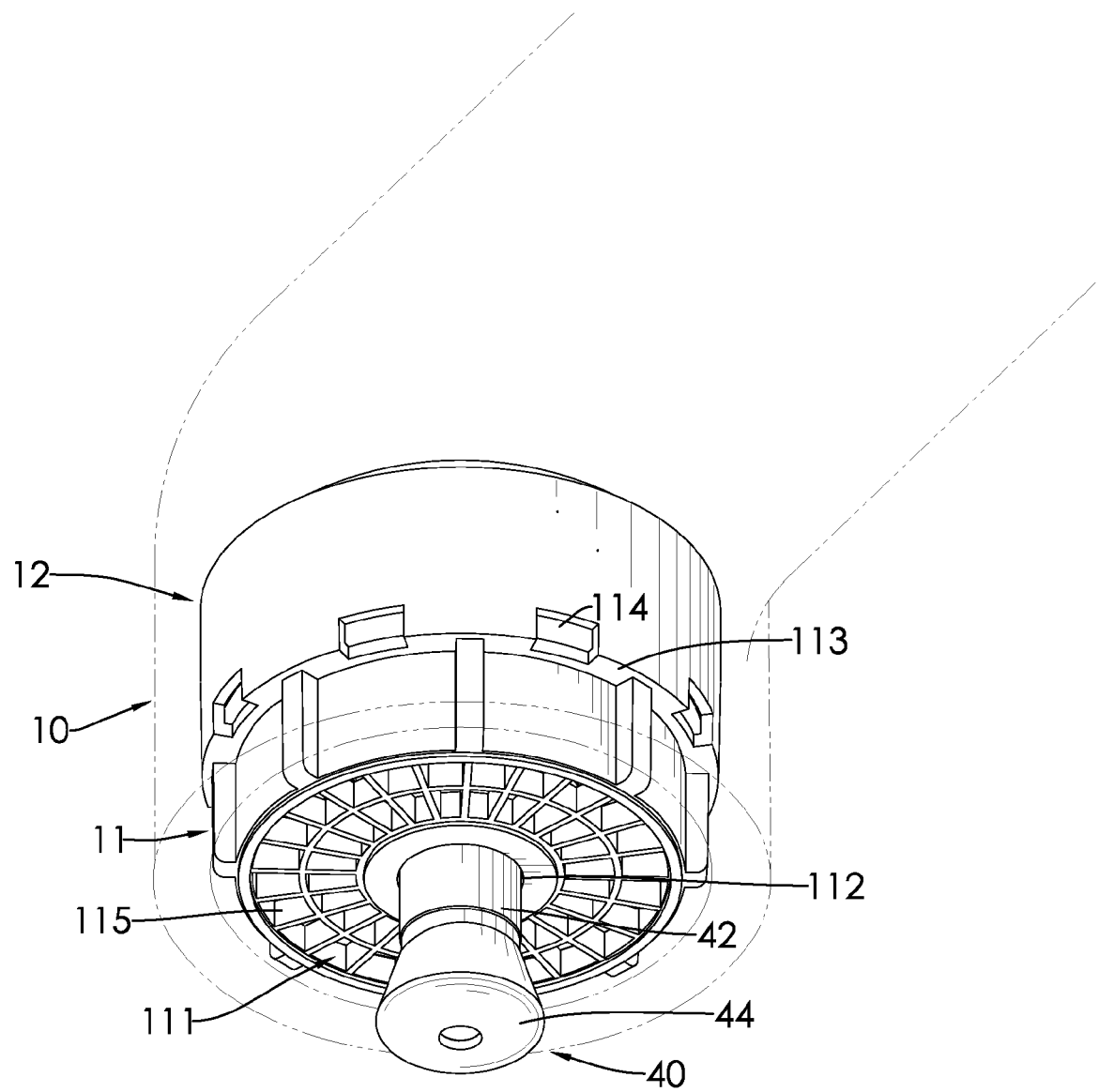
FIG. 1 is a perspective view of a first embodiment of a self-closing water-saving valve assembly in accordance with the present invention, showing the valve assembly mounted in a tap.
Figure 2:
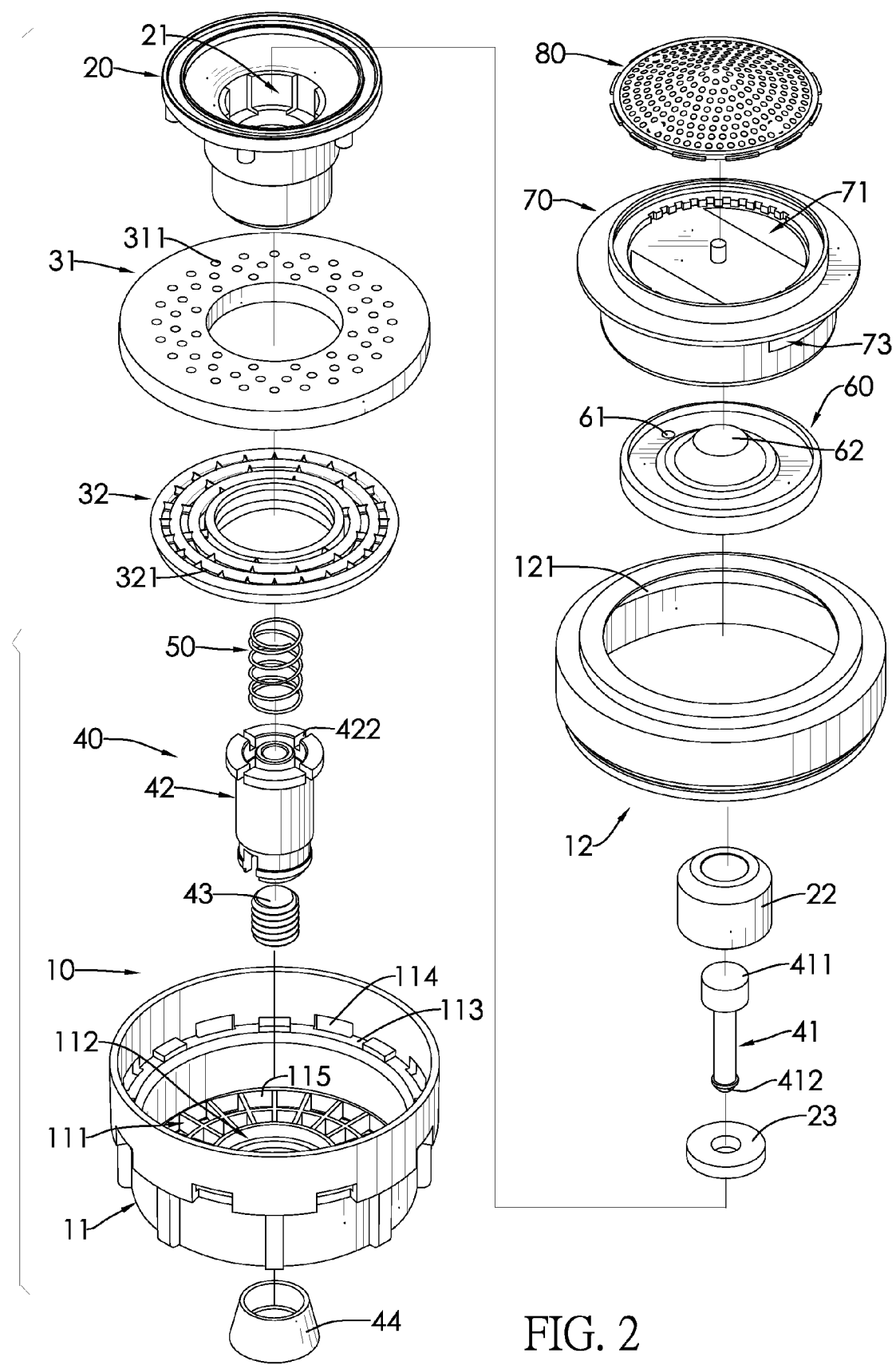
FIG. 2 is an exploded perspective view of the self-closing water-saving valve assembly in FIG. 1.

With reference to FIGS. 1 and 2, a self-closing water-saving valve assembly in accordance with the present invention comprises a casing 10, a seat 20, a pushing rod 40, a closing member 60 and a stand 70. In a preferred embodiment, the valve assembly further has a valve 31, a net frame 32, a resilient element 50 and a conical screen 80.

Figure 3:
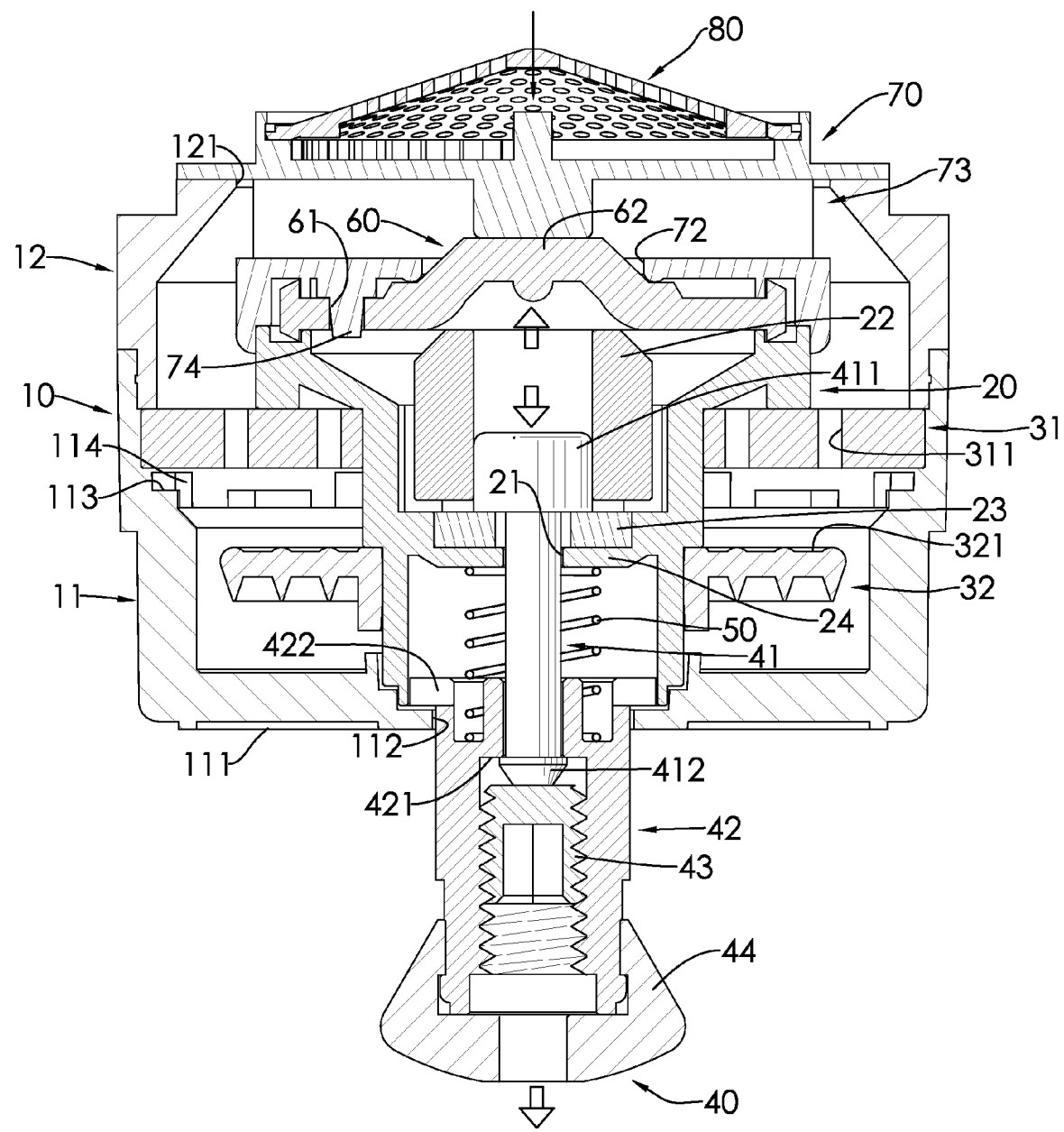
FIG. 3 is a side view in partial section of the self-closing water-saving valve assembly in FIG. 1.

With reference to FIGS. 1 to 3, the casing 10 has an inner space, an inlet 121, an outfall 111 and a casing hole 112. The outfall 111 communicates with the inlet 121. The casing hole 112 and the outfall 111 are on the same side of the casing 10. In a preferred embodiment, the casing 10 has a base 11 and a cover 12. The base 11 and the cover 12 wrap around the inner space. The outfall 111 and the casing hole 112 are formed through the casing 10. The outfall 111 has multiple outlets 115 surrounding the casing hole 112 and arranged as a grille with a radiating pattern. The side wall of the base 11 is step-shaped and has a stepped surface 113 and multiple air holes 114. The air holes are formed through the stepped surface 113 at intervals. The inlet 121 is formed through the cover 12.

Figure 4:
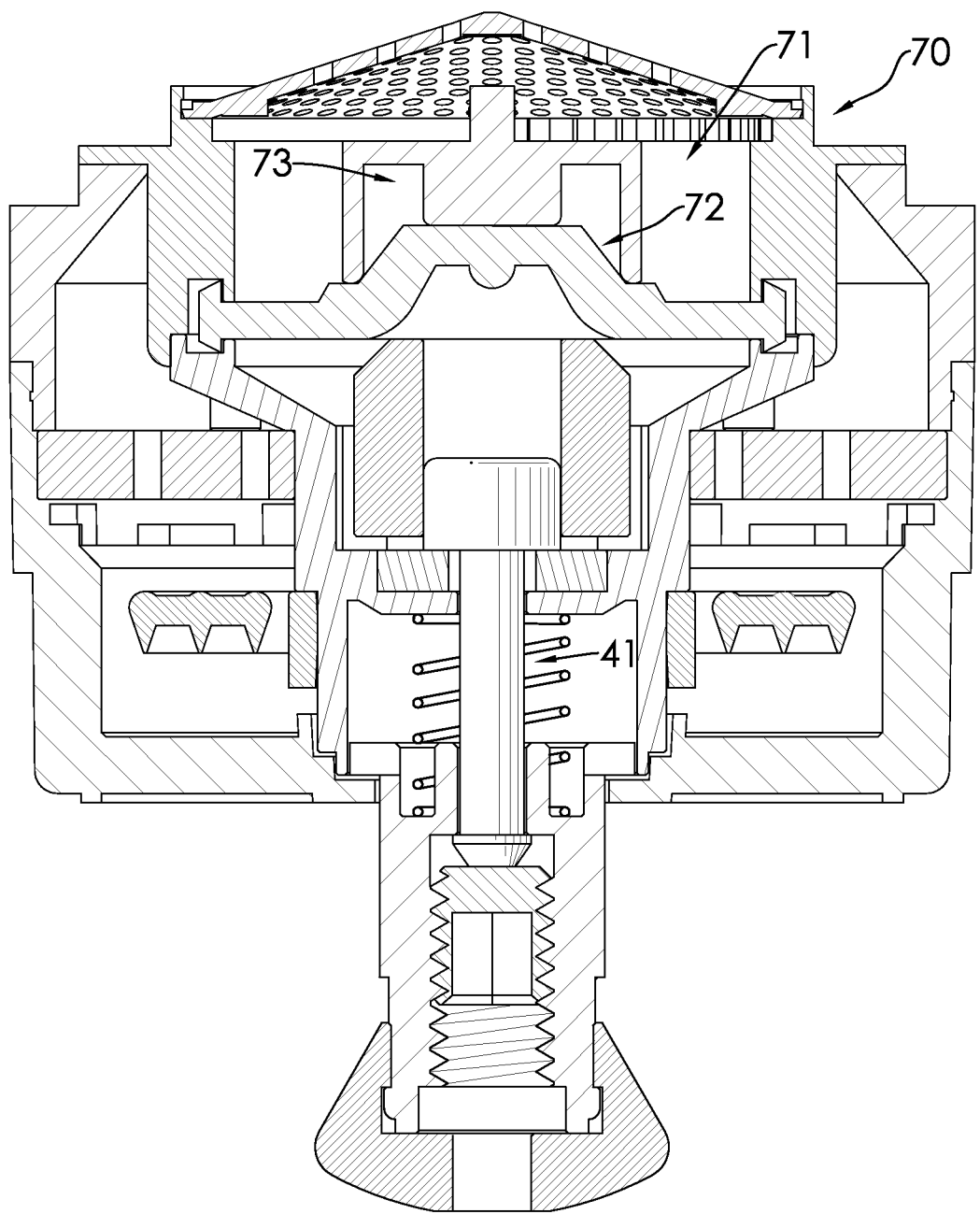
FIG. 4 is a front view in partial section of the self-closing water-saving valve assembly in FIG. 1.
Figure 5:
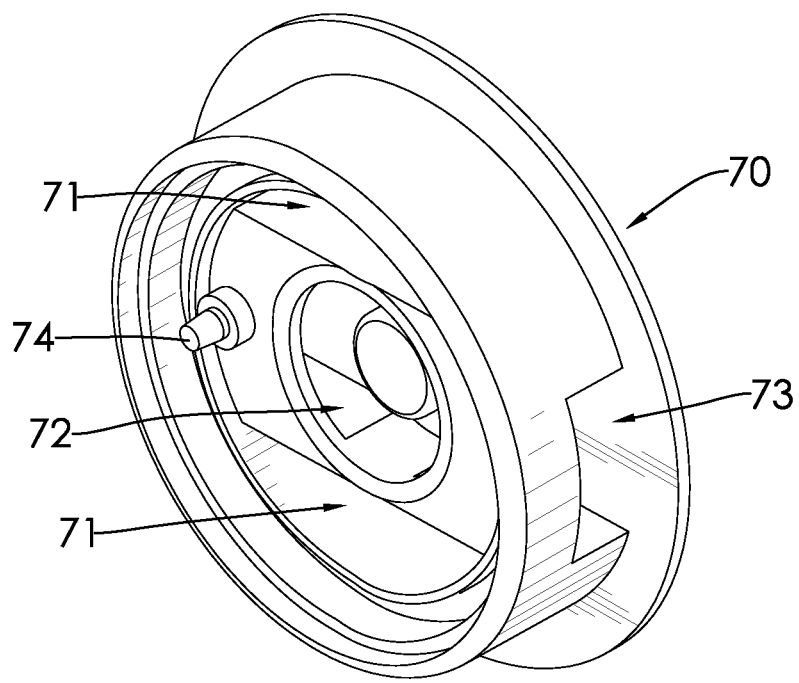
FIG. 5 is a perspective view of a stand of the self-closing water-saving valve assembly in FIG. 1.

With reference to FIGS. 2 to 4, the seat 20 is mounted in the casing 10 and has an inner space, a top opening, a bottom opening, an annular flange 24 and a seat hole 21. The annular flange 24 is formed around an inside surface of the seat 20. The seat hole 21 is surrounded by the annular flange 24. In a preferred embodiment, the seat 20 has a limit 22 and a buffer gasket 23. The limit 22 is mounted in the seat 20. The buffer gasket 23 is mounted in the seat 20, is mounted on a top surface of the annular flange 24 and surrounds the seat hole 21.

The valve 31 is mounted around the seat 20, is circular, and has multiple permeable holes 311 formed through the valve 31.

The net frame 32 is mounted around the seat 20, is circular and has multiple net holes 321 formed through the net frame 32.

The pushing rod 40 is moveably mounted in the seat hole 21 of the seat 20 and has a top end, a bottom end and an upper abutter 411. The bottom end is mounted through and protrudes out of the bottom opening of the seat 20 and the casing hole 112 of the casing 10. The upper abutter 411 is mounted on the top end of the pushing rod 40, selectively abuts a periphery of the seat hole 21 of the seat 20 and selectively closes the seat hole 21. In a preferred embodiment, the pushing rod 40 has a closer 41, a lower abutter 412, a presser 42, an adapter 43 and a surrounder 44. The closer 41 is mounted in the seat hole 21. The upper abutter 411 is mounted on a top end of the closer 41 and is mounted in the limit 22 of the seat 20. The lower abutter 412 is mounted on a bottom end of the closer 41. The presser 42 is mounted around and disposed below the closer 41, protrudes out of the casing hole 112 and has an inner space, a top opening, a bottom opening, multiple inner threads, a stepped surface 421 and multiple permeable recesses 422. The inner threads are formed on an inside wall of the presser 42. The stepped surface 421 is formed on the inside wall of the presser 42, is formed above the inner threads and selectively abuts downward against the lower abutter 412. The permeable recesses 422 are formed in a top surface of the presser 42, are annularly arranged separately on the top surface of the presser 42, transversely communicate with the top opening of the presser 42 and transversely communicate with the exterior environment. The adapter 43 is screwed into the presser 42 and selectively abuts the bottom end of the closer 41. The surrounder 44 is securely mounted around the bottom opening of the presser 42.

The resilient element 50 is mounted between the seat 20 and the pushing rod 40 and pushes down the pushing rod 40 such that the pushing rod 40 extends out. In a preferred embodiment, the resilient element is preferably, but not limited to, a spring. The resilient element 50 abuts the presser 42 of the pushing rod 40 and pushes down the presser 42. The stepped surface 421 of the presser 42 abuts downward against the lower abutter 412 of the closer 41, the adapter 43 is screwed into the presser 42, and the surrounder 44 is mounted securely around the presser 42. So the closer 41, the adapter 43 and the surrounder 44 are moved down together by the presser 42.

The closing member 60 is mounted on the seat 20, closes the top opening of the seat 20 and has a bulge 62 and an aperture 61. The bulge 62 is formed on a center of the closing member 60. The aperture 61 is formed through the closing member 60. In a preferred embodiment, the closing member 60 is a round plate.

With reference to FIGS. 2 to 5, the stand 70 is mounted on the casing 10, closes the inlet 121 and has at least one inlet channel 71, a flowing recess 72, at least one outlet channel 73 and a protrusion 74. The at least one inlet channel 71 is formed through the stand 70. The flowing recess 72 is formed in a bottom of the stand 70 and is selectively closed by the bulge 62 of the closing member 60. The at least one outlet channel 73 is formed through a side wall of the stand 70 and communicates with the flowing recess 72. The at least one outlet channel 73 does not communicate with the at least one inlet channel 71. The protrusion 74 is formed on the bottom of the stand 70 and mounted in the aperture 61 of the closing member 60. In a preferred embodiment, the stand 70 is mounted on the cover 12 of the casing 10 and has two inlet channels 71 and two outlet channels 73. The inlet channels 71 are formed downward through the stand 70 at intervals. The outlet channels 73 are respectively formed through two opposite side surfaces of the stand 70. The protrusion 74 is circular in cross section and is narrower from top to bottom. A diameter of the protrusion 74 is slightly smaller than a diameter of the aperture 61 of the closing member 60 such that the protrusion 74 does not close the aperture 61 and a slight flow of water can pass through a gap between the protrusion 74 and the aperture 61.

Figure 6:
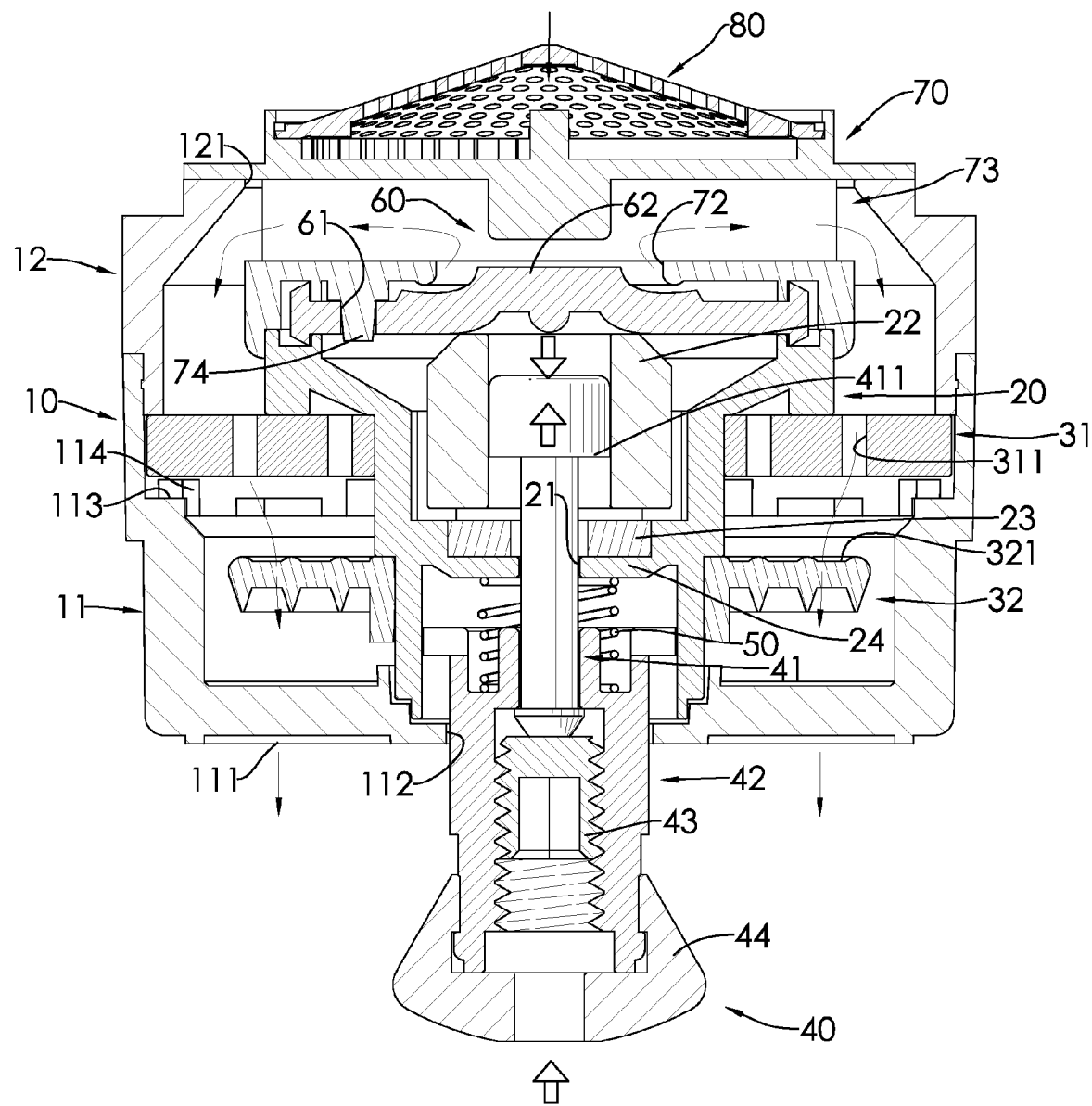
FIG. 6 is a side view in partial section of the self-closing water-saving valve assembly in FIG. 1, showing a pushing rod pushed.

With reference to FIG. 6, the limit 22 of the seat 20 is a sleeve, is mounted in the seat 20, and is mounted around the upper abutter 411 of the pushing rod 40. A gap is formed between an inner wall of the limit 22 and the upper abutter 411 of the pushing rod 40. When the closing member 60 abuts downward against the limit 22, the limit 22 divides a chamber between the seat 20 and the closing member 60 into an outer chamber and an inner chamber. The outer chamber is formed between an outer wall of the limit 22, the seat 20, and the closing member 60. The inner chamber is formed between the inner wall of the limit 22, the upper abutter 411, and the closing member 60, and communicates with the outer chamber only via the gap between the limit 22 and the upper abutter 411.

The conical screen 80 is mounted on and covers a top surface of the stand 70.

With reference to FIGS. 1, 2, 5 and 6, to install the self-closing water-saving valve assembly as described, the casing 10 is mounted securely inside an outfall of a tap. When the self-closing water-saving valve assembly is in use and is switched on, the upper abutter 411 of the pushing rod 40 does not close the seat hole 21 of the seat 20. The bulge 61 of the closing member 60 does not protrude upward enough to close the flowing recess 72 of the stand 70. So the route of the water flow has no obstruction. The water from the outfall of the tap passes through the conical screen 80, the inlet channels 71, the flowing recess 72, the outlet channels 73 of the stand 70, the inner space of the casing 10, the permeable holes 311 of the valve 31 and the net holes 321 of the net frame 32 in sequence. Finally the water flows out from the outfall 111 of the base 11.

When the water flows, an air pressure difference causes air to enter from the air holes 114 of the base 11. Air mixes with the water to form foam. The foam and the water flow out from the outlets 115 of outfall 111 of the base 11 such that washing is easy and the water usage is saved.

With reference to FIGS. 2, 3 and 6, during the course of water flowing in the valve assembly, part of the water flows into a room between the seat 20 and the closing member 60 from the gap between the protrusion 74 and the aperture 61. The water between the seat 20 and the closing member 60 also pushes down the closer 41 of the pushing rod 40. The route of said part of water is so winding and indirect that the water only generates slight water pressure and can only slowly push down the closer 41. In addition, the weight of the pushing rod 40 also slowly moves down the pushing rod 40. The resilient element 50 also slowly pushes down the presser 42. Therefore, the whole pushing rod 40 slowly moves down. The closer 41 moves down until the upper abutter 411 abuts downward against the buffer gasket 23 and closes the seat hole 21. Then the room between the seat 20 and the closing member 60 is gradually filled with water from the gap between the protrusion 74 and the aperture 61. The water gradually pushes up the closing member 60 such that the bulge 62 is deformed and protrudes upward to abut and close the flowing recess 72 of the stand 70, which blocks the water flow and achieves the self-closing effect.

Because the deformation of the closing member 60 takes place gradually, the water between the seat 20 and the closing member 60 flows out slowly and gradually, which provides a gradual effect of switching off and can effectively reduce positive and negative pressure waves generated in the water pipe. The water hammer is also prevented.

Furthermore, to stop the water flow, the pushing rod 40 is moved by the slight water pressure, the gravity and the resilient element 50, eliminating the problem of wear. So the moving speed of the pushing rod 40 and the time of the water flowing out are stable. The valve assembly has prolonged lifespan therefore.

To switch on the valve assembly, the pushing rod 40 is pushed up. The adapter 43 pushes up the closer 41 and then the upper abutter 411 of the closer 41 departs from the seat hole 21 of the seat 20. At the time, the water between the seat 20 and the closing member 60 flows down into the seat 20. The water then passes through the permeable recesses 422 of the presser 42 and flows out from the casing hole 112. At the same time, because the water between the seat 20 and the closing member 60 flows out, the bulge 62 descends and does not close the flowing recess 72 of the stand 70. Consequently, the water can pass through the stand 70 again and can flow out from the outfall 111 of the base 11.

Because the water pressure is not directly applied on the pushing rod 40, it is easier for a user to push the pushing rod 40 to switch on the valve assembly.

To sum up, the valve assembly as described reduces the water hammer, has prolonged lifespan and is easier to be switched on.

Figure 7:
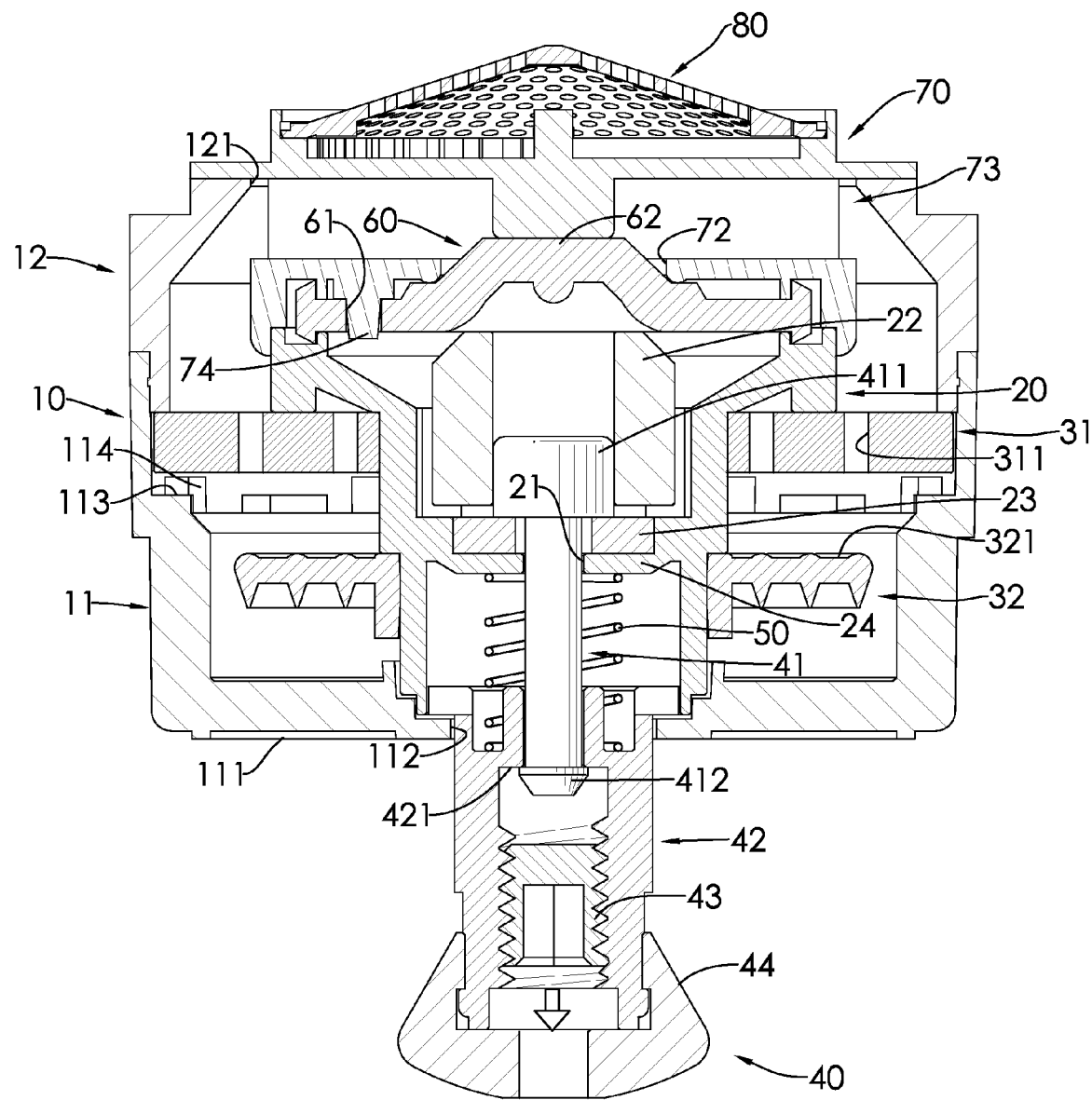
FIG. 7 is a side view in partial section of the self-closing water-saving valve assembly in FIG. 1, showing an adapter moved downward.

With further reference to FIG. 7, when the presser 42 is pushed up to switch on the valve assembly, the closer 41 is not pushed directly by the presser 42 but by the adapter 43, which is screwed in the presser 41. Thus, the adapter 43 is moved down by rotation and does not abut the closer 41 immediately when the presser 42 is pushed. Instead, after the presser 42 moves up for a distance, the adapter 43 abuts and pushes the closer 43, which shortens the moving distance of the closer 41 and shortens the time of the water flowing out. As a result, the time of the water flowing out can be adjusted.

Figure 8:
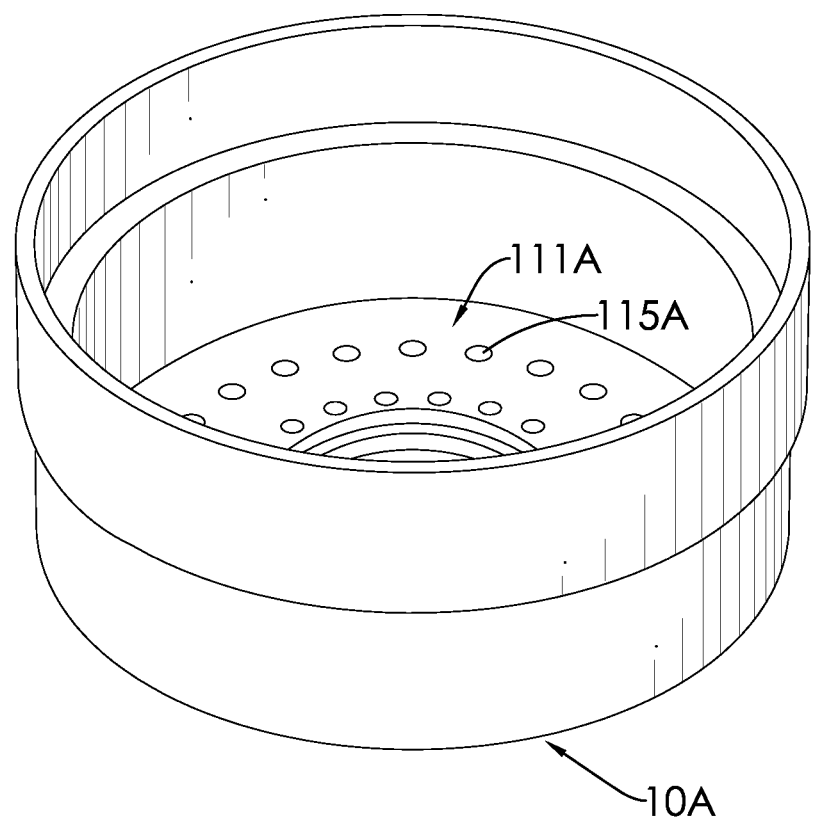
FIG. 8 is a perspective view of a casing of a second embodiment of a self-closing water-saving valve assembly in accordance with the present invention.
Figure 9:
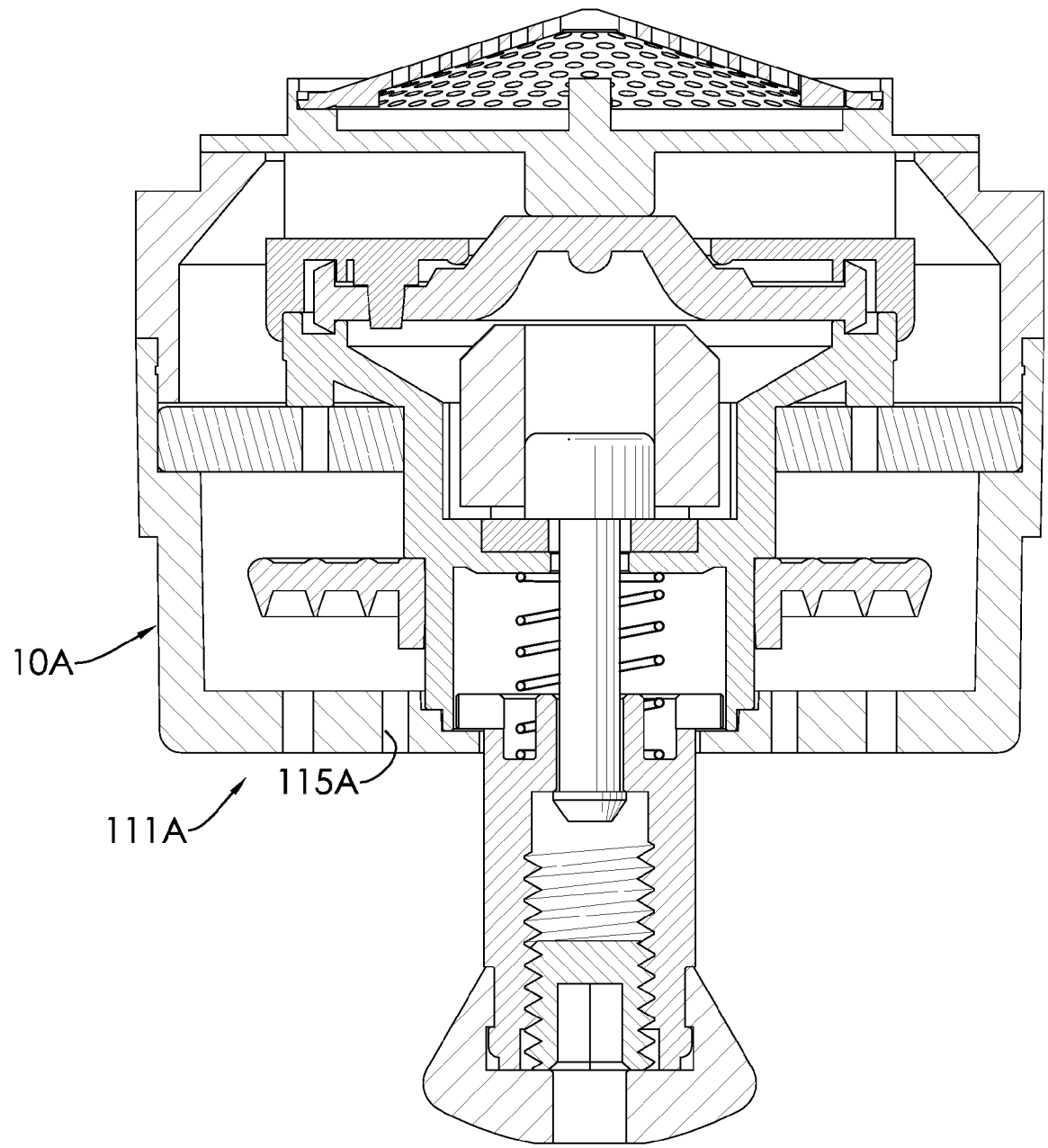
FIG. 9 is a side view in partial section of the self-closing water-saving valve assembly in FIG. 8.
Figure 10:
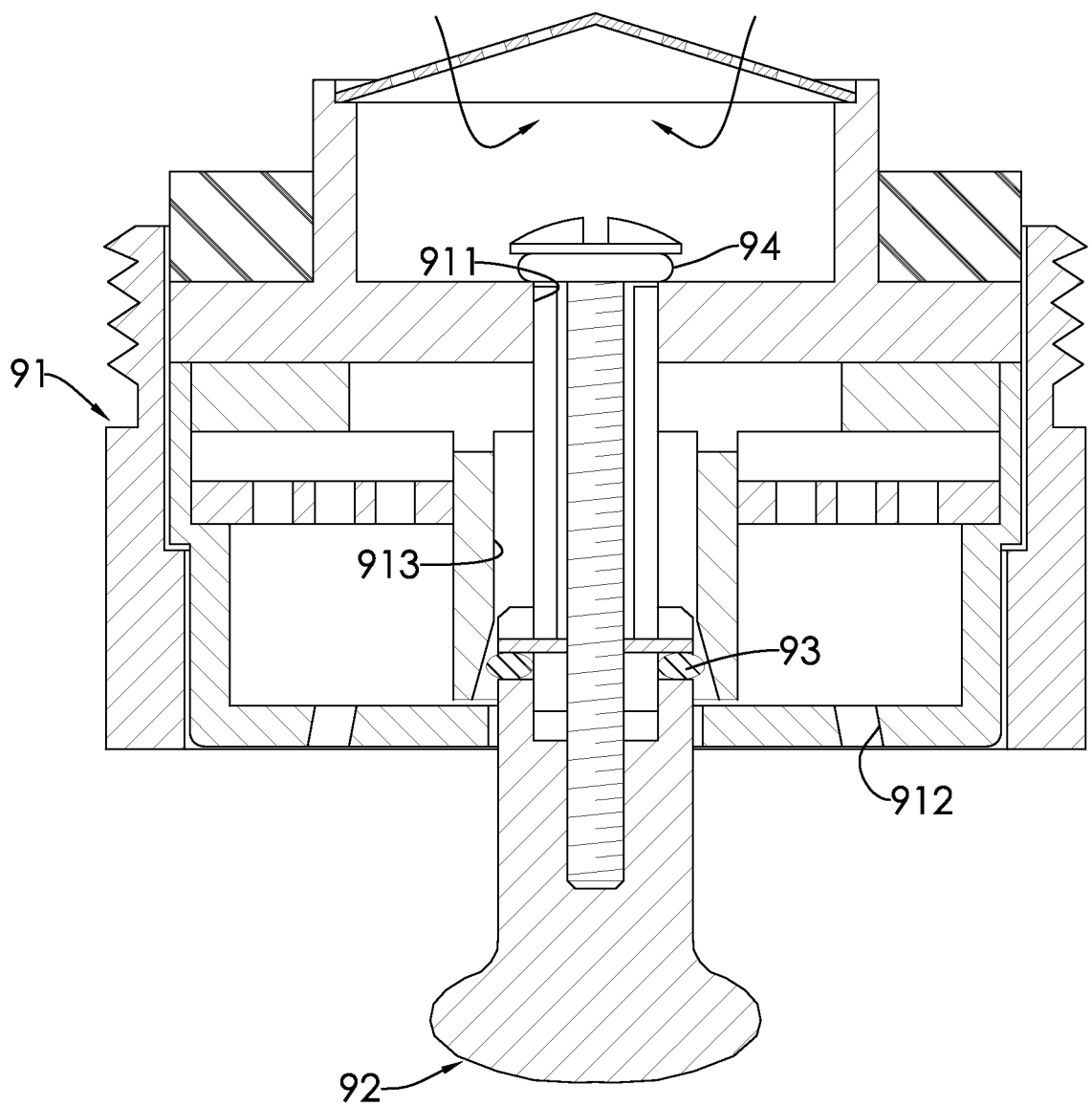
FIG. 10 is a side view in partial section of a conventional self-closing water-saving valve assembly in accordance with the prior art.
Figure 11:
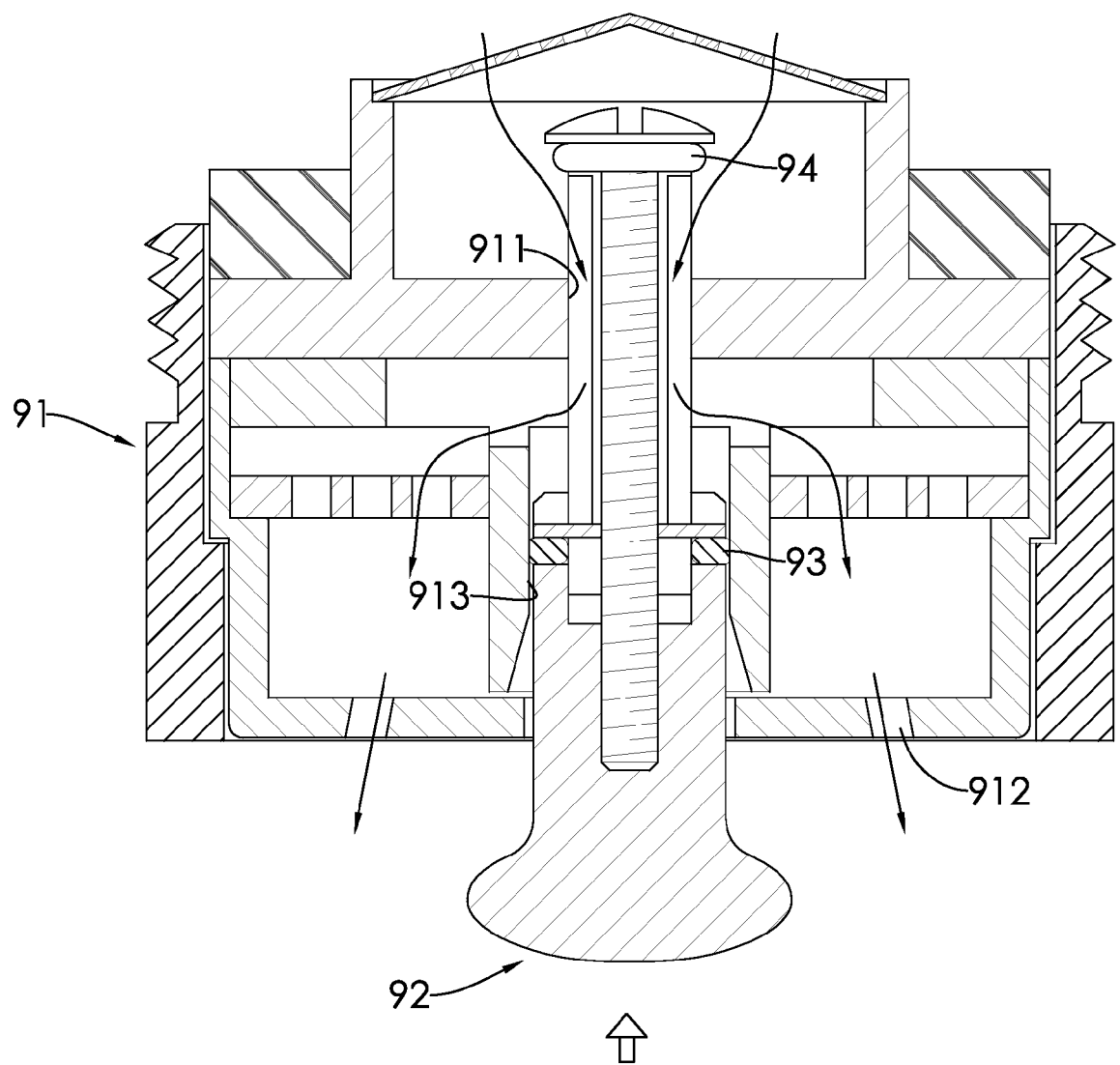
FIG. 11 is a side view in partial section of the conventional self-closing water-saving valve assembly in FIG. 10, showing a pushing rod pushed.

In another preferred embodiment as shown in FIGS. 8 and 9, the valve assembly has no net frame and the casing 10A has no air hole. Each outlet 115A of the outfall 111A is circular and the outlets 115A are annularly and separately arranged such that the water flowing out is formed into multiple thin spouts.

In another preferred embodiment, the diameter of the protrusion of the stand and the diameter of the aperture of the closing member can be the same. Because the closing member is made of material with slight resilience, the water pressure can deform the aperture and generate a gap. So the water still can pass through the gap between the protrusion and the aperture.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A self-closing water-saving valve assembly comprising:
    a casing having
        an inner space;
        an inlet;
        an outfall communicating with the inlet; and
        a casing hole; the casing hole and the outfall being on a same side of the casing;
    a seat mounted in the casing and having
        an inner space;
        a top opening;
        a bottom opening;
        an annular flange formed around an inside surface of the seat; and
        a seat hole surrounded by the annular flange;
    a pushing rod moveably mounted in the seat hole of the seat and having
        a top end;
        a bottom end mounted through and protruding out of the bottom opening of the seat and the casing hole of the casing; and
        an upper abutter mounted on the top end of the pushing rod and selectively closing the seat hole of the seat;
    a closing member mounted on the seat, closing the top opening of the seat and having
        a bulge formed on a center of the closing member; and
        an aperture formed through the closing member; and
    a stand mounted on the casing, closing the inlet and having
        at least one inlet channel formed through the stand;
        a flowing recess formed in a bottom of the stand and selectively closed by the bulge of the closing member;
        at least one outlet channel formed through a side wall of the stand and communicating with the flowing recess; and
        a protrusion formed on the bottom of the stand and mounted downward in the aperture of the closing member;
    wherein the seat further has
        a limit being a sleeve, mounted in the seat, and mounted around the upper abutter of the pushing rod; and
        a gap formed between an inner wall of the limit and the upper abutter of the pushing rod;

wherein when the closing member abuts downward against the limit,
the limit divides a chamber between the seat and the closing member into:
an outer chamber formed between an outer wall of the limit, the seat, and the closing member;
and an inner chamber formed between the inner wall of the limit, the upper abutter, and
the closing member, and communicating with the outer chamber only via the gap.

2. The self-closing water-saving valve assembly as claimed in claim 1, wherein the seat has
a buffer gasket mounted in the seat, mounted on a top surface of the annular flange of the seat and surrounding the seat hole.

3. The self-closing water-saving valve assembly as claimed in claim 1, wherein the closing member is a round plate.

4. The self-closing water-saving valve assembly as claimed in claim 1, wherein a diameter of the aperture of the closing member is slightly bigger than a width of the protrusion of the stand.

5. The self-closing water-saving valve assembly as claimed in claim 1 further comprising a net frame mounted around the seat, being circular and having multiple net holes formed through the net frame, wherein
the outfall of the casing has multiple outlets surrounding the casing hole and arranged as a grille with a radiating pattern; and
a side wall of the casing is step-shaped and has
a stepped surface; and
multiple air holes formed through the stepped surface of the casing at intervals.

6. The self-closing water-saving valve assembly as claimed in claim 1, wherein the outfall of the casing has multiple outlets surrounding the casing hole.

7. The self-closing water-saving valve assembly as claimed in claim 1 further comprising a valve mounted around the seat, being circular, and having multiple permeable holes formed through the valve.

8. The self-closing water-saving valve assembly as claimed in claim 1, wherein the pushing rod has
a closer mounted in the seat hole; the upper abutter mounted on a top end of the closer;
a lower abutter mounted on a bottom end of the closer;
a presser mounted around the closer, disposed below the closer, protruding out of the casing hole and having
an inner space;
a top opening;
a bottom opening;
multiple inner threads formed on an inside wall of the presser; and
a stepped surface formed on the inside wall of the presser, formed above the inner threads and abutting downward the lower abutter when the valve assembly is closed; and
an adapter screwed into the presser and selectively abutting the bottom end of the closer.

9. The self-closing water-saving valve assembly as claimed in claim 8, wherein the presser of the pushing rod has
at least one permeable recess formed in a top surface of the presser, transversely communicating with the top opening of the presser and transversely communicating with an exterior environment.

10. The self-closing water-saving valve assembly as claimed in claim 1 further comprising a resilient element mounted between the seat and the pushing rod and pushing down the pushing rod.

11. The self-closing water-saving valve assembly as claimed in claim 10, wherein the resilient element is a spring.

12. The self-closing water-saving valve assembly as claimed in claim 11, wherein the pushing rod has
a closer mounted in the seat hole; the upper abutter mounted on a top end of the closer;
a lower abutter mounted on a bottom end of the closer;
a presser mounted around the closer, disposed below the closer, protruding out of the casing hole and having
an inner space;
a top opening;
a bottom opening;
multiple inner threads formed on an inside wall of the presser; and
a stepped surface formed on the inside wall of the presser, formed above the inner threads and abutting downward the lower abutter when the valve assembly is closed; and
an adapter screwed into the presser and selectively abutting the bottom end of the closer.

13. The self-closing water-saving valve assembly as claimed in claim 12, wherein the presser of the pushing rod has
at least one permeable recess formed in a top surface of the presser, transversely communicating with the top opening of the presser and transversely communicating with an exterior environment.

14. The self-closing water-saving valve assembly as claimed in claim 13, wherein the seat has
a buffer gasket mounted in the seat, mounted on a top surface of the annular flange of the seat and surrounding the seat hole.

15. The self-closing water-saving valve assembly as claimed in claim 14, wherein the closing member is a round plate.

16. The self-closing water-saving valve assembly as claimed in claim 15, wherein a diameter of the aperture of the closing member is slightly bigger than a width of the protrusion of the stand.

17. The self-closing water-saving valve assembly as claimed in claim 16 further comprising a net frame mounted around the seat, being circular and having multiple net holes formed through the net frame, wherein
the outfall of the casing has multiple outlets surrounding the casing hole and arranged as a grille with a radiating pattern; and
a side wall of the casing is step-shaped and has
a stepped surface; and
multiple air holes formed through the stepped surface of the casing at intervals.

18. The self-closing water-saving valve assembly as claimed in claim 16, wherein the outfall of the casing has multiple outlets surrounding the casing hole.

19. The self-closing water-saving valve assembly as claimed in claim 18 further comprising a valve mounted around the seat, being circular, and having multiple permeable holes formed through the valve.

* * * * *